(12) United States Patent
Gross et al.

(10) Patent No.: US 6,822,038 B1
(45) Date of Patent: Nov. 23, 2004

(54) AQUEOUS COATING SUBSTANCE, METHOD FOR ITS PRODUCTION AND ITS USE

(75) Inventors: Lutz-Werner Gross, Haltern (DE); Ludwig Moorkamp, Münster (DE); Heinz-Ulrich Grumpe, Senden (DE); Ulrich Poth, Münster (DE)

(73) Assignee: BASF Coatings AC, Munster (DE)

( * ) Notice: Subject to any disclaimer, the term of this patent is extended or adjusted under 35 U.S.C. 154(b) by 289 days.

(21) Appl. No.: 10/030,307

(22) PCT Filed: Jul. 5, 2000

(86) PCT No.: PCT/EP00/06286

§ 371 (c)(1),
(2), (4) Date: Feb. 26, 2002

(87) PCT Pub. No.: WO01/04222

PCT Pub. Date: Jan. 18, 2001

(30) Foreign Application Priority Data

Jul. 12, 1999 (DE) .......................................... 199 32 497

(51) Int. Cl.[7] .............................. C08J 3/00; C08K 3/20; C08L 75/00; C08F 8/30; C08F 20/00
(52) U.S. Cl. ....................... 524/507; 524/539; 524/590; 524/591; 524/839; 524/840; 524/123; 524/127; 524/128; 524/440; 524/455
(58) Field of Search ................................ 524/507, 539, 524/590, 591, 839, 840; 525/123, 127, 128, 455, 440

(56) References Cited

U.S. PATENT DOCUMENTS

| | | | |
|---|---|---|---|
| 3,361,844 A | 1/1968 | Hoeschele ................... 260/858 |
| 4,268,542 A | 5/1981 | Sakakibara et al. .......... 427/195 |
| 4,653,615 A | 3/1987 | Hidkinson et al. .......... 188/79.5 |
| 4,675,234 A | 6/1987 | Sachs et al. ................. 427/327 |
| 4,710,542 A | 12/1987 | Forgione et al. ............. 525/127 |
| 4,754,014 A | 6/1988 | Ryntz et al. ................... 528/28 |
| 5,028,639 A | 7/1991 | Treutlein et al. ............. 523/200 |
| 5,126,393 A | 6/1992 | Blum et al. .................. 524/538 |
| 5,210,154 A | 5/1993 | Weidemeier et al. ....... 525/438 |
| 5,334,420 A | 8/1994 | Hartung et al. ........... 427/407.1 |
| 5,356,669 A | 10/1994 | Rehfuss et al. ........... 427/407.1 |
| 5,425,970 A | 6/1995 | Lahrmann et al. .......... 427/493 |
| 5,474,811 A | 12/1995 | Rehfuss ................... 427/407.1 |
| 5,502,101 A | 3/1996 | Schwarte et al. ........... 524/460 |
| 5,516,559 A | 5/1996 | Röckrath et al. ........ 427/407.1 |
| 5,589,228 A | * 12/1996 | Wegner et al. ........... 427/407.1 |
| 5,601,878 A | 2/1997 | Kranig et al. ................ 427/386 |
| 5,601,880 A | 2/1997 | Schwarte et al. ........ 427/407.1 |
| 5,605,965 A | 2/1997 | Rehfuss et al. .............. 525/100 |
| 5,707,941 A | 1/1998 | Haberle ......................... 528/44 |
| 5,905,132 A | 5/1999 | Wegner et al. ................ 528/45 |
| 5,965,213 A | 10/1999 | Sacharski et al. |
| 6,001,424 A | 12/1999 | Lettmann et al. ........ 427/407.1 |
| 6,221,949 B1 | 4/2001 | Gross et al. ................. 524/451 |
| 6,309,707 B1 | 10/2001 | Mayer et al. ................ 427/386 |

FOREIGN PATENT DOCUMENTS

| | | | |
|---|---|---|---|
| CA | 2073115 | 8/2001 | ......... C09D/175/14 |
| CA | 2079498 | 8/2001 | ............ B05D/3/06 |
| CA | 2102169 | 8/2001 | ......... C09D/133/00 |
| DE | 3706095 | 2/1987 | ........... C08G/77/20 |
| DE | 3636183 | 3/1988 | ............ C09D/5/38 |
| DE | 4204518 | 2/1992 | ............ B05D/1/36 |
| DE | 4222194 | 7/1992 | ............ C09D/5/46 |
| DE | 4414032 | 4/1994 | ........... C08G/18/75 |
| DE | 4421823 | 6/1994 | ......... C09D/175/04 |
| DE | 19613547 | 4/1996 | ............ C09D/5/46 |
| DE | 197 05 219 A1 | 8/1998 | ........... C09D/17/00 |

(List continued on next page.)

OTHER PUBLICATIONS

BASF Coatings AG et al., Frieling, patent application No. 09/367,021 filed on Sep. 22, 1999, entitled "Universal pigment pastes and their use for the manufacture of aqueous paints", pp. 1–61 and the Abstract on 2 pages.

English Abstract on Cover Page of the International Publication for WO92/22615.

English Abstract on Cover Page of the International Publication for WO94/22969, WO94/22968.

English Abstract on Cover Page of the International Publication for WO99/50359.

English Abstract for DE19705219.

English Abstract for EP436941.

English Abstract for DE4142816.

Advanced Organic Coatings Science & Technology Series, 1991, vol. 13, pp. 193–207, B. Singh et al., entitled "Carbamymethylated melamines novel crosslinkers for the coating Inductry".

Chemical Eng. Science, vol. 50, No. 9, pp. 1409–1416, 1995, entitled "Emilsion polymerization of styrene in a continuous taylor vortex flow reactor".

Types of Paints and Coatings (Binders), Revised edition, edit D. Stoye and W. Freitag, Wiley–VCH Weinheim, New York, 1998, pp. 80–86, Entitled Urea, Banzogunanamine, and Melamine Resin for Coatings.

*Primary Examiner*—Patrick D. Niland

(57) ABSTRACT

An aqueous coating material comprising
- A) at least one polyester that is water-soluble or water-dispersible,
- B) at least one polyurethane acrylate that is water-soluble or water-dispersible,
- C) at least one amino resin that is itself water-soluble or water-dispersible or is water-soluble or water-dispersible in the presence of the polyester and the polyurethane acrylate,
- D) at least one of a color pigment, an effect pigment, a color and effect pigment, and a filler, and
- E) optionally at least one polyisocyanate.

Also, processes for preparing and using the aqueous coating material.

38 Claims, No Drawings

FOREIGN PATENT DOCUMENTS

| | | | | |
|---|---|---|---|---|
| EP | 038127 | 3/1981 | ............ | B05D/7/26 |
| EP | 245700 | 4/1987 | ......... | C07D/251/54 |
| EP | 249201 | 6/1987 | ............ | C09D/3/58 |
| EP | 276501 | 9/1987 | ............ | C11D/1/42 |
| EP | 0354261 | 8/1988 | .......... | C08G/18/50 |
| EP | 0358153 | 9/1989 | ......... | C09D/143/04 |
| EP | 0424705 | 10/1990 | ......... | C08F/283/00 |
| EP | 0521928 | 3/1991 | ......... | C08F/299/06 |
| EP | 0593454 | 3/1991 | ............ | B05D/7/26 |
| EP | 498 583 A1 | 1/1992 | ............ | B10J/19/18 |
| EP | 0498583 | 1/1992 | ............ | B01J/19/18 |
| EP | 0522419 | 6/1992 | .......... | C08G/18/67 |
| EP | 0522420 | 6/1992 | ............. | C08J/3/03 |
| EP | 0540884 | 10/1992 | ............ | B05D/3/06 |
| EP | 0568967 | 5/1993 | ............ | B05D/3/00 |
| EP | 0 590 484 A1 | 9/1993 | .......... | C08G/18/08 |
| EP | 0594068 | 10/1993 | .......... | C09D/201/02 |
| EP | 0594071 | 10/1993 | ......... | C09D/201/02 |
| EP | 0594142 | 10/1993 | ........... | C08L/57/12 |
| EP | 0596460 | 11/1993 | ......... | C09D/201/00 |
| EP | 0604922 | 12/1993 | ......... | C08K/5/3492 |
| EP | WO9422969 | 10/1994 | ......... | C09D/133/06 |
| EP | 0730613 | 11/1994 | ......... | C08F/290/14 |
| EP | WO96/20968 | 7/1996 | ........... | C08G/18/40 |
| GB | 1127338 | 6/1967 | ......... | C07C/119/04 |
| GB | 1220717 | 3/1971 | ............ | H01F/27/00 |
| WO | WO9112899 | 9/1991 | ............ | B05D/7/16 |
| WO | WO9222615 | 12/1992 | ......... | C09D/151/08 |
| WO | WO9317060 | 9/1993 | ........... | C08G/63/02 |
| WO | WO9410211 | 5/1994 | ............. | C08F/8/30 |
| WO | WO9410212 | 5/1994 | ............. | C08F/8/30 |
| WO | WO9422968 | 10/1994 | ......... | C09D/133/06 |
| WO | WO9612754 | 5/1996 | ........... | C08G/63/20 |
| WO | WO9712945 | 4/1997 | ............ | C09D/5/04 |
| WO | WO9749745 | 12/1997 | ........... | C08G/18/08 |
| WO | WO9749747 | 12/1997 | ........... | C08G/18/75 |
| WO | WO9950359 | 10/1999 | ............ | C09D/5/00 |

* cited by examiner

AQUEOUS COATING SUBSTANCE, METHOD FOR ITS PRODUCTION AND ITS USE

This application is a National Phase Application of Patent Application PCT/EP00/06286 filed on 5 Jul. 2000.

The present invention has as its subject pigment pastes which comprise as binder at least one polyurethane acrylate (P) that is obtainable by polymerizing, in an organic solvent or in a mixture of organic solvents, (A) ethylenically unsaturated monomers, or a mixture of ethylenically unsaturated monomers, in the presence of (B) a polyurethane resin which has a number-average molecular weight of from 200 to 30,000, preferably from 1000 to 5000, and which contains on average from 0.05 to 1.1, preferably from 0.2 to 0.9 and, with particular preference, from 0.3 to 0.7 polymerizable double bonds per molecule, and converting the resulting reaction product into an aqueous dispersion.

The present invention also relates to aqueous coating materials comprising these pigment pastes and to methods of coating substrates. Finally, the invention relates as well to mixer systems using these pigment pastes.

Aqueous coating materials are pigmented by adding aqueous pigment concentrates, so-called pigment pastes, to the other constituents of the coating material.

Pigment pastes consist usually of water, at least one pigment, at least one water-dilutable binder and, if desired, organic solvents, wetting agents and other additives customary for pigment pastes (cf. Volker Radke in "Pigmente für Anstrichmittel" [Pigments for coating materials], Technische Akademie Esslingen, Kap. 7, Dispersion of Pigments, Export-Verlag, 1990).

In order for these pigment pastes to be able to be used as universally as possible and so permit the cost-effective preparation of a large number of in some cases very different paints, these pigment pastes should be as highly pigmented as possible. However, this leads in turn generally to a large number of problems, such as high pigment paste viscosity, inadequate pigment paste shelf life (in general, the pigment pastes are desired to have a shelf life of at least 6 months on storage at room temperature or one month on storage at 40° C.) or poor dispersibility (in other words, a high specific energy input is necessary for dispersing, or the pigment paste thickens in the course of the dispersing operation, or there is a tendency to settling after treatment with a dissolver).

EP-B-521 928 discloses polyurethane acrylates (P) of the type specified at the outset, and their use for preparing pigment pastes. EP-B-521 928, however, merely describes the preparation of three different basecoats using two different white pastes and one pigment paste containing carbon black. Other pigment pastes are not described in EP-B-521 928.

In addition, EP-B-297 576 discloses aqueous polyurethane resin dispersions which are obtainable by polymerizing ethylenically unsaturated compounds in water in the presence of a polyurethane resin which has no double bonds. These polyurethane resin dispersions can likewise be employed, alone or together with other grinding resins, for grinding pigments in order to prepare aqueous coating materials. In EP-B-297 576, however, it is preferred not to employ, as paste resins, hydroxyl-containing acrylate copolymers prepared in the presence of polyurethanes. Furthermore, the preparation of universal pigment paints is not described in EP-B-297 576.

EP-B-438 090, furthermore, discloses pigment pastes and their use in aqueous coating materials, these pigment pastes comprising a polyester urethane as grinding binder. The use of urethane acrylates as grinding binders, in contrast, is not described in EP-B-438 090. These pigment pastes known from EP-B-438 090 have the disadvantage that the stability of highly pigmented pastes, in respect of viscosity, colour strength and stability of shade in the course of storage of the pigment pastes, is in need of improvement.

In comparison to the pastes known from this EP-B-438 090, the pigment pastes of the present application, despite their high pigment content, are intended to be virtually stable in viscosity on storage of the pastes at room temperature for 6 months; in other words, the viscosity of the pastes after storage remains in the range between 50 and 1000 mPa.s under a shear stress of 1000 $s^{-1}$. In addition, the pigment pastes of the present invention should despite the high pigment content remain stable in terms of colour strength and shade ($\pm 10\%$, $\Delta E \leq 1.5$) on storage of the pastes at room temperature for 6 months.

EP-A-424 705, furthermore, discloses pigment pastes which as grinding binders of a nonionically or partly anionically stabilized dispersion comprise an acrylate/polyurethane graft copolymer. These pigment pastes known from EP-A-424 705 differ from the pigment pastes of the present Application in that the pigment pastes described therein have a low pigment/binder ratio and require long milling periods and/or a high specific energy input (>1000 Wh/kg).

Finally, EP-A-311 209 discloses universal pigment pastes and their use in mixer systems for preparing aqueous and conventional paints. The pigment pastes described therein and used to prepare aqueous paints comprise from 0 to 65% by weight of binder, from 10 to 65% by weight of pigment and also organic solvents and, if desired, further additives. Binders specified for the pigment pastes in EP-A-311 209 are alkyd resins and polyurethane resins. The use of urethane acrylates, on the other hand, is not specified in EP-A-311 209. The pigment pastes in EP-A-311 209 have the disadvantage of a high volatile organic content (VOC).

The object on which the present invention is based, therefore, is to provide aqueous pigment pastes which are universally employable and which are easy and cost-effective to prepare. In addition, these pigment pastes should meet the usual requirements. They should therefore in particular have a high level of pigmentation and at the same time an adequate shelf life (at least 6 months on storage at room temperature or 1 month on storage at 40° C.), good dispersibility (i.e. e.g. required specific energy input 50–1000 Wh/kg) and good processability (e.g. pumpability). The pigment pastes should, furthermore, show good formulation and colouristic properties. Finally, the pigment pastes should possess a high colouristic saturation, good colour strength, or good hiding power, and good flow properties.

This object is surprisingly achieved by pigment pastes of the type specified at the outset which are characterized in that they comprise (Pa) from 10 to 35% by weight of at least one polyurethane acrylate resin (P), based on the solids content, (Pb) from 10 to 65% by weight of water and (Pc1) from 18 to 40% by weight of at least one organic, transparent pigment or from 30 to 50% by weight of at least one organic, opaque pigment, or (Pc2) from 30 to 80% by weight of at least one inorganic pigment, with the exception of white pigments, or from more than 50 to 70% by weight of white pigment, or (Pc3) from more than 8 to 15% by weight of carbon black, the proportions by weight of the respective components (Pa) to (Pc) being based in each case on the overall weight of the pigment paste.

Further subjects for the present invention are aqueous paints comprising these pigment pastes, and methods of coating substrates using these paints. Finally, the invention also relates to mixer systems based on these pigment pastes.

It is surprising and was not foreseeable that using the polyurethane acrylates (P) it would be possible to prepare very highly pigmented and yet storage-stable, readily processable pigment pastes which meet the common requirements relating to pigment pastes. Thus it was not foreseeable that it would even be possible in general to operate with a level of pigmentation in the vicinity of the critical pigment volume concentration (c.p.v.c.). Preferably, the level of pigmentation in this context is generally from about 30 to 10%, with particular preference from 5 to 7%, below the c.p.v.c.

Surprisingly, despite the high pigment content, the pigment pastes of the invention even after storage are both virtually stable in viscosity (in other words, the viscosity even after storage at room temperature for 6 months remains at from 50 to 1000 mPa.s at a shear rate of 1000 $s^{-1}$) and stable in terms of the colour strength and in terms of the shade (i.e. colour strength±10%, $\Delta E \leq 1.5$).

A further advantage, finally, is that despite the high pigmentation no dispersing problems arise. For example, an energy input of just 50–1000 Wh/kg, preferably 100–400 Wh/kg, is generally sufficient for dispersion. In addition there are generally no problems, for example, such as thickening during the grinding operation or settling after treatment in a dissolver.

In the text below the individual constituents of the pigment paste of the invention will first of all be elucidated further.

The polyurethane acrylates (P) employed as binders in the pigment pastes of the invention are known and are described, for example, in EP-B-521 928 on page 2, line 56 to page 8, line 16. For details regarding the preparation of these polyurethane acrylates reference is therefore made to this description in EP-B-521 928.

To prepare the binders (P) employed in accordance with the invention, a polyurethane resin (B) is prepared in a first step in accordance with well-known methods of polyurethane chemistry.

The polyurethane resin is prepared from the following components:

(a) a polyester- and/or polyetherpolyol having a number-average molecular weight of from 400 to 5000, or a mixture of such polyester- and/or polyetherpolyols, (b) a polyisocyanate or a mixture of polyisocyanates, (c) if desired, a compound which in addition to a polymerizable double bond also contains at least one NCO-reactive group, or a mixture of such compounds, (d) if desired, a compound which in its molecule has at least one isocyanate-reactive group and at least one group which is capable of forming anions, or a mixture of such compounds, (e) if desired, a compound which has in its molecule at least one NCO-reactive group and at least one poly(oxyalkylene) group, or a mixture of such compounds, and, if desired, (f) a hydroxyl- and/or amino-containing organic compound having a molecular weight of from 60 to 600, or a mixture of such compounds.

The polyurethane resin (B) has a number-average molecular weight of from 200 to 30,000, preferably from 1000 to 5000, and contains on average from 0.05 to 1.1, preferably from 0.2 to 0.9 and, with particular preference, from 0.3 to 0.7 polymerizable double bonds per molecule. It is preferred for the polyurethane resin (B) to have an acid number of from 0 to 2.0. The molecular weight of the polyurethane resins can—as the skilled worker is aware—be controlled in particular by the proportion and functionality of the starting compounds (a) to (f) employed.

The polyurethane resins (B) can be prepared either in bulk or in organic solvents.

The polyurethane resins (B) can be prepared by simultaneous reaction of all starting compounds. In many cases, however, it is judicious to prepare the polyurethane resins in stages. Hence it is possible, for example, to prepare an isocyanate-functional prepolymer from components (a) and (b) which is then reacted further with component (c). It is also possible to prepare, from components (a), (b), (c) and, if used, (d) and (e) an isocyanate-functional prepolymer which can then be reacted with component (f) to give polyurethanes of higher molecular mass. In the cases where use is made as component (c) of a compound which contains only one isocyanate-reactive group, it is possible in a first stage to prepare from (b) and (c) an isocyanate-functional precursor which can subsequently be reacted further with the other components.

The reaction of components (a) to (f) is judiciously carried out in the presence of catalysts such as, for example, dibutyltin dilaurate, dibutyltin maleate, tertiary amines, etc.

The amounts of components (a), (b), (c), (d), (e) and (f) to be employed result from the intended number-average molecular weight and the intended acid number. The polymerizable double bonds can be introduced into the polyurethane molecules through the use of components having polymerizable double bonds (a) and/or by way of component (c). It is preferred to introduce the polymerizable double bonds by way of component (c).

As component (a) it is possible to employ saturated and unsaturated polyester- and/or polyetherpolyols, especially polyester- and/or polyetherdiols, having a number-average molecular weight of from 400 to 5000. Examples of suitable polyetherdiols are those of the general formula H(—O—(CHR$^1$)$_n$—)$_m$OH, where R$^1$=hydrogen or a lower, substituted or unsubstituted alkyl radical, n=2 to 6, preferably 3 to 4 and m=2 to 100, preferably 5 to 50. Examples are linear or branched polyetherdiols such as poly(oxyethylene) glycols, poly(oxypropylene) glycols and poly(oxybutylene) glycols.

The polyetherdiols selected should not introduce excessive amounts of ether groups since otherwise the polymers formed swell in water. The preferred polyetherdiols are poly(oxypropylene) glycols in the molar mass range $M_n$ from 400 to 3000.

Polyesterdiols are prepared by esterifying organic dicarboxylic acids or their anhydrides with organic diols or are derived from a hydroxy carboxylic acid or from a lactone. In order to prepare branched polyesterpolyols it is possible to employ, to a minor extent, polyols or polycarboxylic acids having a higher functionality. The dicarboxylic acids and diols can be linear or branched, aliphatic, cycloaliphatic or aromatic dicarboxylic acids or diols.

The diols used to prepare the polyesters consist, for example, of alkylene glycols, such as ethylene glycol, propylene glycol, butylene glycol, 1,4-butanediol, 1,6-hexanediol, neopentyl glycol and other diols, such as dimethylolcyclohexane. However, it is also possible to add small amounts of polyols, such as trimethylolpropane, glycerol, pentaerythritol.

The acid component of the polyester consists primarily of low molecular mass dicarboxylic acids or their anhydrides having 2 to 44, preferably 4 to 36 carbon atoms in the molecule. Examples of suitable acids are o-phthalic, isophthalic, terephthalic, tetrahydrophthalic, cyclohexanedicarboxylic, succinic, adipic, azelaic, sebacic, maleic, fumaric, glutaric, hexachloroheptanedicarboxylic and tetrachlorophthalic acid and/or dimerized fatty acids. Instead of these acids it is also possible to use their anhydrides where they exist. In the formation of polyesterpolyols it is also possible for relatively small amounts of carboxylic acids having three or more carboxyl groups to be present, examples being trimellitic anhydride or the adduct of maleic anhydride with unsaturated fatty acids.

It is also possible to employ polyesterdiols which are obtained by reacting a lactone with a diol. A feature of these is the presence of terminal hydroxyl groups and repeating polyester units of the formula $(—CO—(CHR^2)_n—CH_2—O)$. In this formula n is preferably 4 to 6 and the substituent $R^2$=hydrogen, an alkyl, cycloalkyl or alkoxy radical. No substituent contains more than 12 carbon atoms. The total number of carbon atoms in the substituent does not exceed 12 per lactone ring. Examples of such compounds are hydroxycaproic, hydroxybutyric, hydroxydecanoic and/or hydroxystearic acid.

For preparing the polyesterdiols preference is given to the unsubstituted ε-caprolactone, in which n has the value 4 and all substituents $R^2$ are hydrogen. The reaction with lactone is initiated by low molecular mass polyols such as ethylene glycol, 1,3-propanediol, 1,4-butanediol, dimethylolcyclohexane. It is also possible, however, to react other reaction components, such as ethylenediamine, alkyldialkanolamines or else urea, with caprolactone. Other diols of relatively high molecular mass are polylactamdiols, which are prepared by reacting, for example, ε-caprolactam with low molecular mass diols.

If it is intended to introduce polymerizable double bonds into the polyurethane molecules by way of component (a), then it is necessary to employ components (a) which contain polymerizable double bonds. Examples of such components (a) are polyesterpolyols, preferably polyesterdiols, which have been prepared using polyols and/or polycarboxylic acids containing polymerizable double bonds. Examples of polyols containing polymerizable double bonds are: trimethylolpropane monoallyl ether, glycerol monoallyl ether, pentaerythritol mono- and diallyl ether. Examples of polycarboxylic acids containing polymerizable double bonds are alkenedicarboxylic acids, maleic acid and unsaturated dimerized fatty acids.

As component (b) it is possible to employ aliphatic and/or cycloaliphatic and/or aromatic polyisocyanates. Examples of aromatic polyisocyanates are phenylene diisocyanate, tolylene diisocyanate, xylylene diisocyanate, biphenylene diisocyanate, naphthylene diisocyanate and diphenylmethane diisocyanate.

Because of their good resistance to ultraviolet light, (cyclo)aliphatic polyisocyanates give rise to products having a low tendency towards yellowing. Examples of cycloaliphatic polyisocyanates are isophorone diisocyanate, cyclopentylene diisocyanate and also the hydrogenation products of the aromatic diisocyanates, such as cyclohexylene diisocyanate, methylcyclohexylene diisocyanate and dicyclohexylmethane diisocyanate. Aliphatic diisocyanates are compounds of the formula

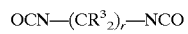
OCN—$(CR^3_2)_r$—NCO in which r is an integer from 2 to 20, in particular from 6 to 8 and $R^3$, which can be identical or different, is hydrogen or a lower alkyl radical having 1 to 8 C atoms, preferably 1 or 2 C atoms. Examples thereof are trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate and trimethylhexane diisocyanate.

Further examples of suitable diisocyanates are diisocyanates of the general formula (III')

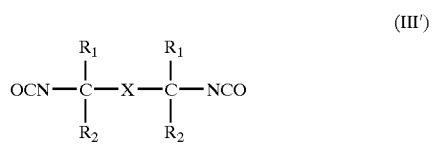

where X is a divalent, aromatic hydrocarbon radical, preferably an unsubstituted or halogen-, methyl- or methoxy-substituted naphthylene, diphenylene or 1,2-, 1,3- or 1,4-phenylene radical, with particular preference a 1,3-phenylene radical and $R_1$ and $R_2$ are an alkyl radical having 1–4 C atoms, preferably a methyl radical. Diisocyanates of the formula (III') are known (their preparation is described, for example, in EP-A-101 832, U.S. Pat. Nos. 3,290,350, 4,130,577 and 4,439,616) and some are obtainable commercially; (1,3-bis(2-isocyanatoprop-2-yl)benzene, for example, is sold by the American Cyanamid Company under the trade name TMXDI (META)®).

Also suitable as the diisocyanate component are diisocyanates of the formula (IV')

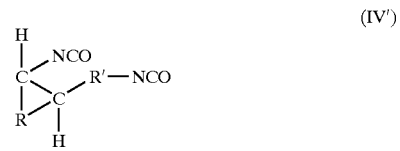

where R is a divalent alkyl or aralkyl radical having 3 to 20 carbon atoms and R' is a divalent alkyl or aralkyl radical having 1 to 20 carbon atoms. Particularly preferred diisocyanates are isophorone diisocyanate and dicyclohexylmethane diisocyanate.

The composition of components (b) in terms of the functionality of the polyisocyanates must be such that no crosslinked polyurethane resin is obtained. In addition to diisocyanates, component (b) may also include a proportion of polyisocyanates having functionalities of more than two—such as triisocyanates, for example.

Products which have been found suitable as triisocyanates are those formed by trimerization or oligomerization of diisocyanates or by reaction of diisocyanates with polyfunctional OH- or NH-containing compounds. Examples of these include the biuret of hexamethylene diisocyanate and water, the isocyanurate of hexamethylene diisocyanate, or the adduct of isophorone diisocyanate with trimethylolpropane. The average functionality can be lowered if required by adding monoisocyanates. Examples of such chain-terminating monoisocyanates are phenyl isocyanate, cyclohexyl isocyanate and stearyl isocyanate.

Component (c) serves to introduce polymerizable double bonds into the polyurethane resin molecules. It is preferred as component (c) to employ a compound which contains at least two NCO-reactive groups and one polymerizable double bond. Particular preference is given to the use, as component (c), of compounds which in addition to a polymerizable double bond also contain two NCO-reactive groups. Examples of NCO-reactive groups are —OH, —SH, >NH and —NH$_2$ groups, preference being given to —OH, >NH and —NH$_2$ groups.

Examples of compounds which can be employed as component (c) are: hydroxy (meth)acrylates, especially hydroxyalkyl(meth)acrylates such as hydroxyethyl, hydroxypropyl, hydroxybutyl or hydroxyhexyl (meth)acrylate and 2,3-dihydroxypropyl(meth)acrylate, 2,3-dihydroxypropyl monoallyl ether, allyl 2,3-dihydroxypropanoate, glycerol mono(meth)acrylate, glycerol monoallyl ether, pentaerythritol mono(meth)acrylate, pentaerythritol di(meth)acrylate, pentaerythritol monallyl ether, pentaerythritol diallyl ether, trimethylolpropane monoallyl ether, trimethylpropane mono(meth)acrylate and trimethylolpropane diallyl ether. As component (c) it is preferred to employ trimethylolpropane monoallyl ether, glycerol mono(meth)acrylate, allyl 2,3-dihydroxypropanoate, pentaerythritol di(meth)acrylate, pentaerythritol diallyl ether, glycerol monoallyl ether and trimethylolpropane mono(meth)acrylate. It is preferred to incorporate the components (c) which contain at least two NCO-reactive groups into the polyurethane molecules at sites within the chain (not at the end).

The introduction into the polyurethane molecules of groups capable of forming anions takes place by way of the incorporation into the polyurethane molecules of compounds (d) whose molecule contains at least one isocyanate-reactive group and one group capable of forming anions.

The amount of component (d) to be employed can be calculated from the target acid number.

As component (d) it is preferred to employ compounds whose molecule contains two isocyanate-reactive groups. Suitable isocyanate-reactive groups are, in particular, hydroxyl groups, and also primary and/or secondary amino groups. Suitable groups capable of forming anions are carboxyl groups, sulphonic acid groups and/or phosphonic acid groups, with preference being given to carboxyl groups. As component (d) it is possible, for example to employ alkanoic acids having two substituents on the α carbon atom. The substituent can be a hydroxyl group, an alkyl group or, preferably, an alkylol group. These alkanoic acids have at least one, generally 1 to 3, carboxyl groups in the molecule. They have from two to about 25, preferably from 3 to 10 carbon atoms. Examples of component (d) are dihydroxypropionic acid, dihydroxysuccinic acid and dihydroxybenzoic acid. A particularly preferred group of alkanoic acids are the α,α-dimethylolalkanoic acids of the general formula

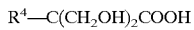

$R^4$—C(CH$_2$OH)$_2$COOH where $R^4$ is a hydrogen atom or an alkyl group having up to about 20 carbon atoms.

Examples of such compounds are 2,2-dimethylolacetic acid, 2,2-dimethylolpropionic acid, 2,2-dimethylolbutyric acid and 2,2-dimethylolpentanoic acid. The preferred dihydroxyalkanoic acid is 2,2-dimethylolpropionic acid. Amino-containing compounds are, for example, α,δ-diaminovaleric acid, 3,4-diaminobenzoic acid, 2,4-diaminotoluenesulphonic acid and 2,4-diamino-diphenyl ether sulphonic acid.

With the aid of component (e) it is possible to introduce poly(oxyalkylene) groups as nonionic stabilizing groups into the polyurethane molecules. As component (e) it is possible, for example, to employ alkoxypoly(oxyalkylene) alcohols having the general formula R'O—(—CH$_2$—CHR"—O—)$_n$H, in which R' is an alkyl radical having 1 to 6 carbon atoms, R" is a hydrogen atom or an alkyl radical having 1 to 6 carbon atoms and n is a number between 20 and 75.

The use of component (f) leads to an increase in the molecular weight of the polyurethane resins. As component (f) it is possible, for example, to employ polyols having up to 36 carbon atoms per molecule, such as ethylene glycol, diethylene glycol, triethylene glycol, 1,2-propanediol, 1,3-propanediol, 1,4-butanediol, 1,2-butylene glycol, 1,6-hexanediol, trimethylolpropane, castor oil or hydrogenated castor oil, ditrimethylolpropane ether, pentaerythritol, 1,2-cyclohexanediol, 1,4-cyclohexanedimethanol, bisphenol A, bisphenol F, neopentyl glycol, neopentyl glycol hydroxypivalate, hydroxyethylated or hydroxypropylated bisphenol A, hydrogenated bisphenol A and mixtures thereof. The polyols are generally employed in amounts of up to 30 per cent by weight, preferably from 2 to 20 per cent by weight, based on the amount of component (a) and (f) employed.

As component (f) it is also possible to employ di- and/or polyamines having primary and/or secondary amino groups. Polyamines are essentially alkylene-polyamines having 1–40 carbon atoms, preferably about 2 to 15 carbon atoms. They may carry substituents which do not have any isocyanate-reactive hydrogen atoms. Examples are polyamines with a linear or branched aliphatic, cycloaliphatic or aromatic structure and at least two primary amino groups. Diamines which can be mentioned are hydrazine, ethylenediamine, propylenediamine, 1,4-butylenediamine, piperazine, 1,4-cyclohexyldimethylamine, 1,6-hexamethylenediamine, trimethylhexamethylendiamine, menthanediamine, isophoronediamine, 4,4'-diaminodicyclohexylmethane and aminoethylethanolamine. Preferred diamines are hydrazine, alkyl- or cycloalkyldiamines such as propylenediamine and 1-amino-3-aminomethyl-3,5,5-trimethylcyclohexane. It is also possible to employ as component (f) polyamines which contain more than two amino groups in the molecule. In such cases, however, care should be taken—for example by using monoamines as well—that no crosslinked polyurethane resins are obtained. Such polyamines which can be used are diethylenetriamine, triethylenetetramine, dipropylenediamine and dibutylenetriamine. Ethylhexylamine is given as an example of a monoamine.

The binders employed in accordance with the invention are prepared by preparing a solution of polyurethane resin (B) in an organic solvent or an organic solvent mixture and, in this solution, polymerizing ethylenically unsaturated monomers or a mixture of ethylenically unsaturated monomers in a free-radical polymerization, and converting the resulting reaction product into an aqueous dispersion. It is preferred to employ water-miscible organic solvents. Examples of solvents which can be used are butylglycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether and 3-methyl-3-methoxybutanol or mixtures of these solvents.

Preference is given to ketones, such as acetone, methyl ethyl ketone, diethyl ketone and methyl isobutyl ketone, for example.

The free-radical polymerization is conducted at temperatures from 80 to 160° C., preferably from 100 to 160° C., in the abovementioned organic solvents or solvent mixtures, if desired under superatmospheric pressure.

Examples of polymerization initiators which can be used are initiators which form free radicals, such as benzoyl peroxide, azobisisobutyronitrile, t-butyl perethylhexanoate and t-butyl perbenzoate, for example.

In the course of the polymerization there are also grafting reactions between the polyurethane resin (B) and component (A). The components (A) and (B) are employed in a weight ratio of from 1:10 to 10:1, preferably from 1:2 to 2:1, and, with particular preference, from 1:1.

Ethylenically unsaturated monomers which can be employed are virtually all free-radically polymerizable monomers but subject to the usual restrictions for copolymerizations as defined by the Q and e scheme of Alfrey and Price and/or by the copolymerization parameters (cf. e.g. Brandrup and Immergut, Polymer Handbook, 2nd ed. John Wiley & Sons, New York (1975)).

Ethylenically unsaturated monomers which can be employed are:

(i) aliphatic or cycloaliphatic esters of acrylic acid or methacrylic acid or a mixture of such esters, and (ii) ethylenically unsaturated monomers which carry at least one hydroxyl group in the molecule, or a mixture of such monomers, and (iii) ethylenically unsaturated monomers which carry at least one carboxyl group in the molecule or a mixture of such monomers, and (iv) ethylenically unsaturated monomers other than (i), (ii) and (iii), or a mixture of such monomers, and also (v) polyunsaturated monomers, especially ethylenically polyunsaturated monomers.

The abovementioned monomers are preferably employed as mixtures, in which component (i) is employed in an amount of from 40 to 100, preferably from 60 to 90% by weight, component (ii) in an amount of from 0 to 20, preferably from 3 to 12% by weight, component (iii) in an amount of from 0 to 30, preferably from 5 to 15% by weight, component (iv) in an amount of from 0 to 30, preferably from 0 to 10% by weight and component (v) in an amount of from 0 to 5, preferably 0% by weight, the sum of the proportions by weight of (i), (ii), (iii), (iv) and (v) always being 100% by weight.

As component (i) it is possible, for example, to employ: cyclohexyl acrylate, cyclohexyl methacrylate, aklyl acrylate and alkyl methacrylates having up to 20 carbon atoms in the alkyl radical, such as methyl, ethyl, propyl, butyl, hexyl, ethylhexyl, stearyl and lauryl acrylate and methacrylate or mixtures of these monomers.

As component (ii) it is possible, for example, to employ: hydroxyalkyl esters of acrylic acid, methacrylic acid or another $\alpha,\beta$-ethylenically unsaturated carboxylic acid. These esters can be derived from an alkylene glycol which is esterified with the acid, or they can be obtained by reacting the acid with an alkylene oxide. As component (ii) it is preferred to employ hydroxyalkyl esters of acrylic and methacrylic acid in which the hydroxyalkyl group contains up to 4 carbon atoms, or mixtures of these hydroxyalkyl esters. Examples of such hydroxyalkyl esters are 2-hydroxyethyl acrylate, 2-hydroxypropyl acrylate, 2-hydroxypropyl methacrylate, 3-hydroxypropyl acrylate, 3-hydroxypropyl methacrylate, 2-hydroxyethyl methacrylate, 3-hydroxybutyl acrylate or 4-hydroxybutyl (meth)acrylate. Corresponding esters of other unsaturated acids, such as ethacrylic acid, crotonic acid and similar acids having up to about 6 carbon atoms per molecule, can also be employed.

As component (iii) it is preferred to employ acrylic acid and/or methacrylic acid. It is also possible, however, to employ other ethylenically unsaturated acids having up to 6 carbon atoms in the molecule. Examples of such acids are ethacrylic, crotonic, maleic, fumaric and itaconic acid.

As component (iv) it is possible, for example, to employ: vinylaromatic hydrocarbons, such as styrene, $\alpha$-alkylstyrene and vinyltoluene, acryl- and methacrylamide and acryl- and methacrylonitrile or mixtures of these monomers.

Compounds which can be employed as components (v) are those containing at least two free-radically polymerizable double bonds in the molecule. Examples are: divinylbenzene, p-methyldivinylbenzene, o-nonyl-divinylbenzene, ethanediol di(meth)acrylate, 1,4-butanediol di(meth)acrylate, 1,6-hexanediol di(meth)acrylate, trimethylolpropane tri(meth)acrylate, pentaerythritol di(meth) acrylate, allyl methacrylate, diallyl phthalate, butanediol divinyl ether, divinylethyleneurea, divinylpropyleneurea, diallyl maleate, etc.

Preference is given to the use of difunctional unsaturated monomers such as butanediol diacrylate or hexanediol diacrylate. If glycidyl methacrylate and methacrylic acid are used the corresponding glycerol dimethacrylate is formed automatically in the course of polymerization. The nature and amount of polyunsaturated monomers should be matched carefully to the reaction conditions (catalysts, reaction temperature, solvents) so that no gelling is obtained. The amount of polyunsaturated monomers added serves to raise the mean molar mass without gelling. However, it is preferred to add no polyunsaturated monomer.

The polymers (P) prepared from (A) and (B) and employed in accordance with the invention must contain groups which are capable of forming anions, which are neutralized before or during the transfer of the polymers from the organic solvent or solvent mixture into water and which allow the formation of stable aqueous dispersions. The polymers concerned may in addition to the groups capable of forming anions also contain nonionic stabilizing groups such as, for example, poly(oxyalkylene) groups, especially poly(oxyethylene) and/or poly(oxypropylene) and/or poly(oxyethylene)(oxypropylene) groups.

The amount of groups capable of forming anions present in the polymers (P) which are employed in accordance with the invention and are prepared from (A) and (B) should be sufficiently high for the polymers to have an acid number of from 5 to 200, preferably from 10 to 40, and, with particular preference, from 15 to 30. The introduction of the groups capable of forming anions into the polymers concerned can take place, for example, by way of components (d) and (iii). The groups capable of forming anions can be present exclusively in component (A) or exclusively in component (B) or both in component (A) and in component (B). It is preferred for from 50 to 100, preferably from 70 to 100 and, with particular preference, 100% of the groups capable of forming anions to be present in component (A).

The introduction of poly(oxyalkylene) groups into the polymers of the invention can take place by way of component (e) or by way of ethylenically unsaturated monomers which contain at least one poly(oxyalkylene) group (e.g. poly(oxyethylene) (meth)acrylates). The polymers of the invention should not contain excessive amounts of poly(oxyalkylene) groups, since otherwise the moisture resistance of the paint films may be reduced. The content of poly(oxyalkylene) groups can be from 1 to 10% by weight, preferably from 1 to 5% by weight (based on the weight of the polymer prepared from (A) and (B)).

The polymers (P) prepared from (A) and (B) and employed in accordance with the invention should preferably contain no nonionic stabilizing groups.

The polymers (P) prepared from (A) and (B) should preferably have a hydroxyl number of from 0 to 100, with particular preference from 20 to 80. The number-average molecular weight of the polymers should preferably be from 2000 to 20,000, with particular preference from 5000 to 12,000.

Particularly preferred polymers (P) are the polymers prepared from (A) and (B) which have a polymolecularity index Q of from 5 to 90, preferably from 5 to 30. The polymolecularity index is the quotient $M_w:M_n$, where $M_w$ is the weight-average and $M_n$ the number-average molecular weight.

The polymolecularity (or polydispersity) index can be influenced, for example, by controlled use of regulators and by the nature of the solvents employed. Q is also influenced by the content of polymerizable double bonds in component (B). Q becomes larger the smaller the amount of regulator employed and the smaller the amount of solvents employed which can function as regulators. The lower the content of polymerizable double bonds in component (B), the greater Q. Q can be determined by gel permeation chromatography using a polystyrene standard.

After the end of the polymerization of component (A), the resulting polymer is at least partly neutralized and is dispersed in water.

Neutralization can be effected using both organic bases and inorganic bases, such as ammonia and hydrazine. It is preferred to use primary, secondary and tertiary amines, such as ethylamine, propylamine, dimethylamine, dibutylamine, cyclohexylamine, benzylamine, morpholine, piperidine and triethanolamine, for example. Particular preference is given to the use of tertiary amines as neutralizing agents, especially dimethylethanolamine, triethylamine, tripropylamine and tributylamine.

Some or, preferably, all of the organic solvents can be distilled off if desired from the aqueous binder dispersions obtained. The binder dispersions comprise polymer particles whose average size lies between 10 and 500 nm, preferably between 60 and 150 nm (measurement method: laser light scattering, instrument: Malvern Autosizer 2 C).

It is essential to the invention that the pigment pastes have a very high pigment content. In this context, however, the respective level of pigmentation depends on the particular type of pigment. For example, pigment pastes containing carbon black are highly pigmented even at a carbon black content of more than 8% by weight, since for carbon black the usual level of pigmentation is about 5–6% by weight, based in each case on the overall weight of the pigment paste. Organic pigments, on the other hand, are employed in opaque paints, for example, in an amount of in general about 20% by weight, and inorganic pigments (with the exception of titanium dioxide) usually in an amount of about 30% by weight (titanium dioxide in general up to 50% by weight), based in each case on the overall weight of the pigment paste. The pigment pastes of the invention comprise the pigments in amounts markedly higher than these. It is possible, preferably, to operate with a level of pigmentation in the vicinity of the critical pigment volume concentration (c.p.v.c.). The level of pigmentation, consequently, is preferably in general from about 3 to 10%, with particular preference from 5 to 7%, below the c.p.v.c. This c.p.v.c. is the amount of incorporated pigment at which the pigment is no longer wetted by the grinding medium. The c.p.v.c. is determined experimentally.

The present invention therefore has as its subject pigment pastes which comprise (Pa) from 10 to 35% by weight, preferably from 15 to 25% by weight, of at least one polyurethane acrylate resin (P), based on the solids content, (Pb) from 10 to 65% by weight, preferably from 20 to 50% by weight, of water and (Pc1) from 18 to 40% by weight, preferably from 24 to 35% by weight, of at least one organic, transparent pigment or from 30 to 50% by weight, preferably from 33 to 45% by weight, of at least one organic, opaque pigment, or (Pc2) from 30 to 80% by weight, preferably from 38 to 50% by weight, of at least one inorganic pigment, with the exception of white pigments, or from more than 50 to 70% by weight of white pigment, or (Pc3) from more than 8 to 15% by weight, preferably from 9 to 12% by weight, of carbon black, the proportions by weight of the respective components (Pa) to (Pc) being based in each case on the overall weight of the pigment paste (hence including any other components employed).

The pigment pastes can in addition—depending on shade—include one or more further constituents, such as in each case, for example, (Pd) from 0 to 10% by weight, preferably from 3 to 8% by weight, of at least one dispersing auxiliary and/or (Pe) from 0 to 10% by weight, preferably from 1 to 5% by weight, of one or more organic solvents and/or (Pf) from 0 to 10% by weight, preferably from 2 to 4% by weight, of one or more binders other than polyurethane (P) (based on solids) and/or (Pg) from 0 to 20% by weight, preferably from 2 to 10% by weight, of one or more fillers and/or extenders and/or (Ph) from 0 to 15% by weight, preferably from 1 to 15% by weight, of one or more customary auxiliaries and/or additives, the proportions by weight of components (Pd) to (Ph) again being based in each case on the overall weight of the respective pigment paste.

The pigment pastes of the invention preferably have a solids content of from 25 to 85% by weight, more preferably from 40 to 70% by weight, the respective solids content depending on the pigment type. In addition, the pigment pastes of the invention preferably have a pH of from 7 to 9, with particular preference from 7.5 to 8.5 and a viscosity, at a temperature of 23° C. and a shear rate of 1000 s$^{-1}$, of from 50 to 800 mPa.s, with particular preference from 100 to 300 mPa.s.

Particularly preferred pigment pastes are obtained if the pigments and the binder or binders are employed in amounts such that the pigment/binder ratio is between 5:1 and 0.5:1, with very particular preference between 3:1 and 2:1.

All organic and inorganic pigments are suitable in principle for use in the pigment pastes of the invention. It is possible, for example, to employ various inorganic pigments, examples being black pigments such as carbon black, colour pigments, examples being iron oxide pigments, such as red iron oxide (hematite, α-diiron trioxide), yellow iron oxide (iron oxide hydroxide) and brown iron oxide (mixed pigment of red iron oxide, yellow iron oxide and black iron oxide), and chromium oxide pigments and mixed-phase oxide pigments, and also organic pigments, such as perylenes, phthalocyanines, diketopyrrolopyrroles, isoindolinones, quinacridones, dioxazines, anthra-quinones, azo pigments, diaryl pigments, indanthrones, benzimidazoles, metal complex pigments, indigo, thioindigo and the like.

The colour pigment pastes designed for solid-colour waterborne paints can also be employed in metallic paints and waterborne refinish paints. The polyurethane acrylate (P) is also suitable for the pasting up of special-effect pigments (without dispersing).

In addition, and especially in the case of critical pigments, the pigment pastes of the invention preferably also include up to 10% by weight, with particular preference from 3 to 8% by weight, of at least one dispersant. Suitable examples are polyalkylene oxides, especially polyoxyethylene, block copolymers having anchor groups with affinity for pigment, examples being amino groups, surfactants, hydroxyaromatic compounds, substituted aromatic compounds, acetylenediol, mixtures of acrylates with surfactants or fatty acids, alkylphenol ethoxylates, polyurethane oligomers and the like.

In addition to the components (Pa) to (Pd) the pigment pastes of the invention may if desired, also include from 0 to 10% by weight, preferably from 1 to 5% by weight, based in each case on the overall weight of the pigment paste, of one or more organic solvents (Pe). With particular preference, however, the pigment pastes are formulated essentially without solvent.

Compounds which may be mentioned as examples of suitable solvents (Pe) are aliphatic or aromatic hydrocarbons, mono- or polyhydric alcohols, ethers, esters, glycol ethers and esters thereof, and ketones, examples being toluene, xylene, butanol, ethyl- or butyl glycol (=ethylene glycol monoethyl or monobutyl ether) and their acetates, butyldiglycol (ethylene glycol dibutyl ether), ethylene glycol dimethyl ether, diethylene glycol dimethyl ether, propylene glycol ether, cyclohexanone, methyl ethyl ketone, acetone, isophorone or mixtures thereof.

The pigment pastes of the invention may if desired also include one or more binders (Pf) other than component (Pa), preferably in an amount of from 1 to 10% by weight, with particular preference from 2 to 4% by weight, based in each case on the overall weight of the pigment paste and on the solids content of these binders.

Examples of suitable binders (Pf) are commonly employed aqueous grinding resins, such as polyurethanes, polyesters, polyacrylates, amino resins, polyethers and carbamates, for example.

The pigment pastes may, furthermore and if desired, include customary fillers and/or extenders (Pg), preferably in an amount of from 0 to 20% by weight, with particular preference from 2 to 10% by weight, based in each case on the overall weight of the pigment paste.

Examples of suitable fillers and/or extenders (Pg) are silicatic fillers, such as kaolin (china clay), talc, siliceous chalk, various types of mica, such as micaceous iron ore, for example, and also silicon carbide and quartz flour, carbonate-type fillers, such as chalk and dolomite; sulphate-type fillers, such as barium and calcium sulphate, for example.

Finally, the pigment pastes may if desired also include further customary auxiliaries and additives (Ph) in customary amounts, preferably in an amount of from 0 to 15% by weight, with particular preference from 1 to 5% by weight, based in each case on the overall weight of the pigment paste.

Examples that may be mentioned are stabilizers, emulsifiers, Theological auxiliaries, for example inorganic phyllosilicates, silica gels, organic cellulose ethers, poly(meth)acrylic acids, poly(meth)acrylamide, polyvinyl alcohol, associative thickeners, such as hydrophobically modified ethoxylated urethanes and the like, for example, plasticizers, such as polypropylene oxides, wetting agents, such as alkylenephenol ethoxylates or acetylenediols, levelling agents, such as acrylates and silicone oils, antifoams, such as silicone oil antifoams and mineral oil antifoams with solid constituents, for example, and also biocides, fungicides, etc. These substances can be added to the individual components and/or to the overall mixture.

The pigment pastes are prepared by the customary methods known to the skilled worker. This usually involves predispersing the pigment or pigments and, if used, the filler or fillers and extender or extenders in a portion of the binder and then carrying out grinding to the sufficient particle size and colour strength. The make-up mixture used is the customary quantity of binder, with or without additional binders and crosslinkers, and also solvents, dispersing auxiliaries and further additives.

The present invention likewise relates to aqueous paints comprising these pigment pastes, these paints containing the pigment paste of the invention in a proportion of from 10 to 60% by weight, preferably from 15 to 30% by weight, based in each case on the overall weight of the aqueous paints.

The pigment pastes are employed in accordance with the present invention, preferably for preparing solid-colour basecoats, but also metallic paints and water-based refinish paints, which are suitable for the coating of metal and/or plastic substrates. The present invention therefore relates likewise to methods of coating metal and/or plastic substrates which are characterized in that aqueous paints are employed which contain from 10 to 60% by weight, preferably from 15 to 30% by weight, of the above-described pigment paste and from 40 to 80% by weight, preferably from 50 to 70% by weight, of a customary coating composition, preferably a solid-colour basecoat composition, based in each case on the overall weight of the aqueous paint.

It is possible, furthermore, to prepare different shades of the basecoat using different pigment pastes of the invention. Also possible, therefore, is the use of the pigment pastes of the invention to construct a mixer system which can be used to produce paints having a fixed shade. Mixer systems of this kind can be used directly, for example, at the premises of the respective paint manufacturer or else at those of the respective customer, for example at the premises of the car maker in order to produce production-line automotive finishes. If the appropriate choice of the crosslinkers or grinding binders (in the sector of refinishing, for example, physically drying binders) also ensures low stoving temperatures of the paints, the pigment pastes of the invention can also be employed to prepare mixer systems in the field of automotive refinishing or of the painting of plastics.

Another subject of the invention, therefore, is a mixer system for the preparation of aqueous coating materials which is characterized in that the mixer system comprises various pigment pastes of the invention.

Then, to prepare the aqueous paints having the particular shade desired, one or more of the pigment pastes of the invention are mixed with one or more pigment-free components which comprise the other constituents of the aqueous paints.

The aqueous paints concerned, preferably solid-colour basecoats, prepared using the pigment pastes of the invention usually include not only the pigment paste but also one or more binders, preferably at least one polyurethane acrylate (P), a crosslinker, such as amino resins, blocked isocyanates, triazine-based crosslinkers, for example, possibly rheological auxiliaries, and/or other customary auxiliaries and additives and also, if desired, organic solvents.

Customary coating materials or solid-colour basecoats which are combined with the pigment paste or pastes of the invention to form the paint of the invention are those comprising customary commercial raw materials, such as polyesters, polyacrylates, cellulose derivatives, preferably at least a portion of the above-described polyurethane acrylate (P), rheological auxiliaries, such as waxes, and also other auxiliaries and additives.

In general, the proportion of urethane acrylate (P) in such paints—depending on shade—is from 10 to 19% by weight, preferably from 12 to 17% by weight. The proportion of crosslinker, in the form for example of a triazine resin, is generally from 3 to 9% by weight, preferably from 4 to 8% by weight. The overall pigment content, depending on shade and pigment type, is generally between 5 and 30% by weight. The water content of such coating systems is usually between 30 and 50% by weight, while the proportion of organic solvents fluctuates in general, depending on the shade and formulation, between 5 and 20% by weight. It is also possible, however, to produce paints which are free from cosolvent.

It is also possible to add crosslinked polymeric microparticles as disclosed in EP-A-38 127 to the basecoats, and/or customary inorganic or organic rheological additives in customary amounts, for example from 0.05 to 6% by weight, based on the overall weight of the basecoat. Effective thickeners, for example, are inorganic phyllosilicates, such as aluminium-magnesium silicates, sodium-magnesium phyllosilicates and sodium-magnesium-fluorine-lithium phyllosilicates of the montmorillonite type, water-soluble cellulose ethers, such as hydroxyethylcellulose, methylcellulose or carboxymethylcellulose, and synthetic polymers having ionic and/or associative groups, such as polyvinyl alcohol, poly(meth)acrylamide, poly(meth)acrylic acid, polyvinylpyrrolidone, styrene-maleic anhydride or ethylene-maleic anhydride copolymers and their derivatives, or else hydrophobically modified, ethoxylated urethanes or polyacrylates. Also suitable is a combination of carboxyl-containing polyacrylate copolymer having an acid number of from 60 to 780, preferably from 200 to 500 mg of KOH/g and a sodium-magnesium phyllosilicate. The sodium-magnesium phyllosilicate can also be employed in the form of an aqueous paste. Preferred pastes comprise either 3% by weight of phyllosilicate and 3% by weight of polypropylene glycol and 2% by weight of phyllosilicate and 2% by weight, based in each case on the overall weight of the paste, of other customary commercial surface-active substances.

The basecoats generally have a solids content of from about 6 to 60% by weight, preferably from 15 to 45% by weight.

The basecoats may in addition include customary organic solvents. The proportion thereof will be kept as low as possible. It is, for example, below 15% by weight.

The basecoasts are generally adjusted to a pH of between 6.5 and 9.0. The pH can be adjusted using customary amines, such as ammonia, triethylamine, dimethylaminoethanol and N-methylmorpholine, for example.

Finally, the pigment pastes of the invention are also suitable for preparing radiation-curable paints, especially paints which are curable by means of UV radiation or electron beams. To this end the pigment pastes of the invention are combined with radiation-curable binder solutions and/or radiation-curable binder dispersions and also any other auxiliaries and additives typical for radiation-curable paints. It is surprising that no instances of incompatibility occur here despite the fact that the pigment pastes of the invention are not themselves radiation-curable and do not comprise a radiation-curable polyurethane dispersion.

The paints of the invention prepared with the aid of pigment pastes of the invention (e.g. basecoats, UV paints and the like, see above) can be applied to a very wide variety of substrates, such as metal, plastic, wood or paper, for example. Application takes place by customary methods, such as spraying, knife coating, dipping or brushing, for example.

The coating materials of the invention are preferably used to produce topcoats as part of a single-coat or multicoat finish. The coating materials of the invention can be employed, for example, for both the production-line finishing and the refinishing of car bodies. They are preferably employed in the field of production-line finishing.

The paints of the invention are normally cured, after initial drying and overcoating with clearcoats, at temperatures from 80 to 160° C., preferably at temperatures from 100 to 140° C. In specific forms of use of the paints of the invention it is possible, given an appropriate choice of crosslinkers, to employ lower curing temperatures or to employ physically drying systems.

In the text below the invention is elucidated further on the basis of working examples. In these examples, all parts and percentages are by weight unless expressly stated otherwise.

1. Preparing a Polyurethane Acrylate Dispersion (Component a)

In a reaction vessel with stirrer, reflux condenser and two feed vessels 63.5 parts of isophorone diisocyanate are added to a mixture of 77.6 parts of a polyesterdiol having a number-average molecular weight of 630 and formed from adipic acid, hexanediol and neopentyl glycol, 9.3 parts of neopentyl glycol, 3.0 parts of trimethylolpropane monoallyl ether, 0.1 part of dibutyltin dilaurate and 110.2 parts of methyl isobutyl ketone. The reaction mixture is subsequently heated to 105° C. At an NCO content of 1.8%, 15.1 parts of trimethylolpropane are added to the reaction mixture and the reaction is continued until isocyanate groups can no longer be detected.

Subsequently, at a temperature of 105° C., a mixture of 69.6 parts of n-butyl acrylate, 69.6 parts of methyl methacrylate, 16.6 parts of hydroxypropyl methacrylate and 13.0 parts of acrylic acid is added to the reaction mixture over the course of 3 hours. At the same time, 5.1 parts of t-butyl perethylhexanoate, dissolved in 42.8 parts of methyl isobutyl ketone, are metered in over the course of 3.5 hours. After a further 2.5 hours at 105° C. the reaction mixture is cooled to 90° C. Then 10.6 parts of dimethylethanolamine and 483.2 parts of deionized water are added. Removal of the methyl isobutyl ketone in vacuo gives a stable 43% dispersion at a pH of 7.9.

2. Preparing Pigment Pastes 2.1 Preparing a Pigment Paste 1 Containing Inorganic Pigments 350.0 g of the above-described polyurethane acrylate dispersion are introduced into a vessel. With stirring (4 m/s) 40.0 g of deionized water and 350.0 g of a chromium titanium pigment are added. The batch is then treated with a laboratory dissolver at a stirrer speed of 20 m/s for 5 minutes. During this treatment the temperature remains below 40° C. After dissolver treatment beforehand, the mixture is subjected to circulation grinding in a continuous laboratory stirrer mill (grinding medium=SAZ beads; grinding medium size=1.0 to 1.6 mm; degree of filling of the grinding chamber=75% and rotor speed=7.5 m/s). The specific energy input is 100 Wh/kg. The temperature remains below 40° C. Subsequently, the paste meets the requirements of an aqueous pigment paste which is employed in a production-line automotive finish (cf. also Table 1).

2.2 Preparing a Pigment Paste 2 Containing Organic Pigments 290.0 g of the above-described polyurethane acrylate dispersion are introduced into a vessel. With stirring (4 m/s) 140.0 g of deionized water and 35.0 g of a commercial wetting and dispersing additive are added and 285.0 g of a phthalocyanine blue pigment. The batch is then treated with a laboratory dissolver at a stirrer speed of 20 m/s for 5 minutes. During this treatment the temperature remains below 40° C. After dissolver treatment beforehand, the mixture is subjected to circulation grinding in a continuous laboratory stirrer mill (grinding medium=SAZ beads; grinding medium size=1.0 to 1.6 mm; degree of filling of the grinding chamber=75% and rotor speed=7.5 m/s). The specific energy input is 460 Wh/kg. The temperature remains below 40° C. Subsequently, the paste meets the requirements of an aqueous pigment paste which is employed in a production-line automotive finish (cf. also Table 1).

2.3 Preparing a Pigment Paste 3 Containing White Pigments 350.0 g of the above-described polyurethane acrylate dispersion are introduced into a vessel. With stirring (4 m/s) 16.0 g of deionized water and 16.0 g of isopropoxypropanol are added and 415.0 g of a titanium dioxide pigment. The batch is then treated with a laboratory dissolver at a stirrer speed of 20 m/s for 5 minutes. During this treatment the temperature remains below 40° C. After dissolver treatment beforehand, the mixture is subjected to circulation grinding in a continuous laboratory stirrer mill (grinding medium= SAZ beads; grinding medium size=1.0 to 1.6 mm; degree of filling of the grinding chamber=75% and rotor speed=7.5 m/s). The specific energy input is 75 Wh/kg. The temperature remains below 40° C. Subsequently, the paste meets the requirements of an aqueous pigment paste which is employed in a production-line automotive finish (cf. also Table 1).

TABLE 1

Storage stability of the pigment pastes 1 to 3

| Paste | Parameter | As-obtained value | Value after storage |
| --- | --- | --- | --- |
| 1 | Colour strength | 100.0% | 97.7% |
| 1 | Colour locus | 0.0 DE | 0.2 DE |
| 1 | Viscosity | 315 mPa · s | 422 mPa · s |
| 2 | Colour Strength | 100.0% | 103.9% |
| 2 | Colour locus | 0.0 DE | 0.25 DE |
| 2 | Viscosity | 300 mPa · s | 331 mPa · s |
| 3 | Whitening power | 100.0% | 98% |
| 3 | Colour locus | 0.0 DE | 0.12 DE |
| 3 | Viscosity | 350 mPa · s | 440 mPa · s |

Key to Table 1

Colour strength: measured by colorimetry using a white blend in which the amounts of the above-described white paste 3 and the pigment paste are chosen so that there is one part of colour pigment (solids) to 10 parts of titanium dioxide (solids).

Colour locus: measured by colorimetry; the figure stated for the pigment pastes 1 and 2 is the colour locus for the pure shade, and for the pigment paste 3 the colour locus of the white reduction (1 part of colour pigment, solids, to 10 parts of titanium dioxide, solids)

Viscosity: The figure stated is the viscosity at a temperature of 23° C. and measured at a shear rate of 1000 $s^{-1}$ 3. Preparing a Make-up Mixture for Preparing Water-borne Paints The apparatus is first of all cleaned by rinsing it with solvent and deionized water. To improve homogenization, all of the components employed to prepare the make-up mixture are treated in a dissolver.

First of all, 21.4 parts of a solution of thixotropic agent based on a synthetic phyllosilicate (3% in deionized water) are introduced and are treated for about 10 minutes with a dissolver (maximum stirrer speed). Then 39.0 parts of the above-described polyurethane acrylate dispersion and then 0.6 part of a customary commercial antifoam based on a combination of liquid hydrocarbons, hydrophobic silica, synthetic copolymers and nonionic emulsifiers are added. Then 3.0 parts of butyl diglycol, 1.5 parts of butyl glycol, 5.0 parts of Shellsol® T, 5.0 parts of N-methylpyrrolidone and 2.5 parts of ethylhexanol are added. Subsequently, 5.0 parts of a customary commercial wetting agent solution based on acetylenediol (12.5% in butyldiglycol) and 2.5 parts of polypropylene glycol are added. To adjust the pH to 7.8–8.5, 3.0 parts of a 10% strength amine solution are added and the batch is finally adjusted with 11.5 parts of deionized water to give the desired solids content.

4. Preparing Solid-colour Basecoats 4.1 Preparing a White Solid-colour Waterborne Basecoat 50.0 parts of the white paste 3 described above are introduced into a vessel and the remaining constituents, set out below, are treated in a dissolver. 44.0 parts of the above-described make-up mixture are first of all added to the white paste. Then 3.25 parts of a customary commercial melamine resin (90% in isobutanol, commercial product Cymel 327 from Cyanamid) and 2.1 parts of a further customary commercial melamine resin (100%, commercial product Cymel 303 from Cyanamid) are added. Then, for improved crosslinking, 0.65 part of a customary commercial catalyst solution based on para-toluenesulphonic acid (25% in isopropanol) is added. The batch is then treated in a dissolver for 30 minutes (maximum stirrer speed).

4.2 Preparing a Blue Solid-colour Waterborne Basecoat 20.0 parts of the blue paste 2 described above are introduced into a vessel and the remaining constituents, set out below, are treated in a dissolver. 71.0 parts of the above-described make-up mixture are first of all added to the blue paste. Then 9.0 parts of a customary commercial melamine resin (90% in isobutanol, commercial product Cymel 327 from Cyanamid) are added. The batch is then treated in a dissolver for 30 minutes (maximum stirrer speed).

What is claimed is:

1. An aqueous coating material comprising
   A) at least one polyester that is water-soluble or water-dispersible,
   B) at least one polyurethane acrylate that is water-soluble or water-dispersible,
   C) at least one amino resin that is itself water-soluble or water-dispersible or is water-soluble or water-dispersible in the presence of the polyester and the polyurethane acrylate,
   D) at least one of a color pigment, an effect pigment, a color and effect pigment, and a filler, and
   E) optionally, at least one polyisocyanate, wherein the polyester comprises a reaction product of
   a1) a mixture comprising
      a11) from 40 to 80 mol % of the mixture of at least one of an aliphatic polycarboxylic acid, a cycloaliphatic polycarboxylic acid, an esterifiable derivative of an aliphatic polycarboxylic acid, and an esterifiable derivative of a cycloaliphatic polycarboxylic acid,
      a12) from 20 to 60 mol % of the mixture of at least one of an aromatic polycarboxylic acid and an esterifiable derivative of an aromatic polycarboxylic acid; and
   a2) at least 60 mol % of the polyester of at least one of an aliphatic polyol and a cycloaliphatic polyol, wherein each of the aliphatic polyol and the cycloaliphatic polyol include in its molecule at least one structural element —C($R^1R^2$)—CH$_2$OH, wherein $R^1$ and $R^2$ are each at least one of a methylol group, a 1 to 20 carbon aliphatic hydrocarbon radical, a cyclo-aliphatic hydrocarbon radical, and an aromatic hydrocarbon radical.

2. The coating material of claim 1, wherein a1) and a2) are reacted with one another in a molar ratio a1):a2) of 1.1:1 to 2:1.

3. The coating material of claim 1, wherein the degree of branching of the polyester is from 1.0 to 2.0 mol/kg.

4. The coating material of claim 1, wherein the polyester has at least one of a number-average molecular weight of from 650 to 2500 daltons, an acid number of from 25 to 55 mg KOH/g, and a hydroxyl number of from 80 to 180 mg KOH/g.

5. The coating material of claim 1, wherein the coating material comprises a mixture product of
   A) from 2 to 90% by weight of the polyester,
   B) from 1 to 80% by weight of the polyurethane acrylate,
   C) from 1 to 80% by weight of the amino resin, and
   D) from 1 to 95% by weight of at least one of the color pigment, the effect pigment, the color and effect pigment, and the filler,
   the percentages by weight being based on an overall solids content of the coating material.

6. The coating material of claim 1, wherein the polyisocyanate is added in an amount of from 0.5 to 50% by weight based on an overall solids content of the coating material.

7. The coating material of claim 1, wherein (A), (B), and (C) are added in a ratio (A):(B):(C) of 25–70:10–40:10–40.

8. The coating material of claim 1, wherein the polyurethane acrylate comprises a reaction product of a free-radical polymerization in an aqueous dispersion
   B1) of at least one dispersed polyurethane resin comprising a reaction product of
      b1) at least one polyisocyanate and optionally at least one monoisocyanate;
      b2) at least one of a polyesterpolyol and a polyetherpolyol each having a number-average molecular weight of from 400 to 5000;
      b3) at least one compound comprising at least one of
         b31) at least one isocyanate-reactive group and
         b32) at least one of an anionic group and a group convertible into anions by neutralizing agents, and
         b33) at least one nonionic hydrophilic group; and
      b4) at least one compound comprising
         b41) at least one isocyanate-reactive group and
         b42) at least one olefinically unsaturated group; and
   B2) at least one olefinically unsaturated monomer.

9. The coating material of claim 1, wherein the amino resin comprises a melamine-formaldehyde resin containing $C_1$ to $C_4$ alkyl ether groups and containing from 0.1 to 1.5 free imino groups per melamine nucleus.

10. The coating material of claim 1 further comprising at least one ingredient curable with actinic radiation.

11. A process comprising applying the coating material of claim 1 to a substrate to form an at least one coat paint system.

12. The paint system produced by the process of claim 11.

13. A product produced by the process of claim 11.

14. A process for preparing an aqueous coating material comprising mixing at least the following in an aqueous medium:
   A) at least one polyester that is water-soluble or water-dispersible,
   B) at least one polyurethane acrylate that is water-soluble or water-dispersible,
   C) at least one amino resin that is itself water-soluble or water-dispersible or is water-soluble or water-dispersible in the presence of the polyester and the polyurethane acrylate, and
   D) at least one of a color pigment, an effect pigment, a color and effect pigment, and a filler,
   wherein the polyester comprises a reaction product of
   a1) a mixture comprising
      a11) from 40 to 80 mol % of the mixture of at least one of an aliphatic polycarboxylic acid, a cycloaliphatic polycarboxylic acid, an esterifiable derivative of an aliphatic polycarboxylic acid, and an esterifiable derivative of a cycloaliphatic polycarboxylic acid,
      a12) from 20 to 60 mol % of the mixture of at least one of on aromatic polycarboxylic acid and an esterifiable derivative of an aromatic polycarboxylic acid; and
   a2) at least 60 mol % of the polyester of at least one of an aliphatic polyol and a cycloaliphatic polyol, wherein each of the aliphatic polyol and the cycloaliphatic polyol include in its molecule at least one structural element —C($R^1R^2$)—$CH_2OH$, wherein $R^1$ and $R^2$ are each at least one of a methylol group, a 1 to 20 carbon aliphatic hydrocarbon radical, a cyclo-aliphatic hydrocarbon radical, and an aromatic hydrocarbon radical.

15. The process of claim 14, wherein a1) and a2) are reacted with one another in a molar ratio a1):a2) of 1.1:1 to 2:1.

16. The process of claim 14, wherein the degree of branching of the polyester is from 1.0 to 2.0 mol/kg.

17. The process of claim 14, wherein the polyester has at least one of a number-average molecular weight of from 650 to 2500 daltons, an acid number of from 25 to 55 mg KOH/g, and a hydroxyl number of from 80 to 180 mg KOH/g.

18. The process of claim 14, wherein the coating material comprises a mixture product of
   A) from 2 to 90% by weight of the polyester,
   B) from 1 to 80% by weight of the polyurethane acrylate,
   C) from 1 to 80% by weight of the amino resin, and
   D) from 1 to 95% by weight of at least one of the color pigment, the effect pigment, the color and effect pigment, and the filler,
   the percentages by weight being based on an overall solids content of the coating material.

19. The process of claim 14, wherein (A), (B), and (C) are added in a ratio (A):(B):(C) of 25–70:10–40:10–40.

20. The process of claim 14, wherein the polyurethane acrylate comprises a reaction product of a free-radical polymerization in an aqueous dispersion
   B1) of at least one dispersed polyurethane resin comprising a reaction product of
      b1) at least one polyisocyanate and optionally at least one monoisocyanate;
      b2) at least one of a polyesterpolyol and a polyetherpolyol each having a number-average molecular weight of from 400 to 5000;
      b3) at least one compound comprising at least one of
         b31) at least one isocyanate-reactive group and
         b32) at least one of an anionic group and a group convertible into anions by neutralizing agents, and
         b33) at least one nonionic hydrophilic group; and
      b4) at least one compound comprising
         b41) at least one isocyanate-reactive group and
         b42) at least one olefinically unsaturated group; and
   B2) at least one olefinically unsaturated monomer.

21. The process of claim 14, wherein the amino resin comprises a melamine-formaldehyde resin containing $C_1$ to $C_4$ alkyl ether groups and containing from 0.1 to 1.5 free imino groups per melamine nucleus.

22. The process of claim 14, wherein the mixing further comprises at least one ingredient curable with actinic radiation.

23. The process of claim 14 further comprising applying the coating material to a substrate to form an at least one coat paint system.

24. The paint system produced by the process of claim 23.

25. A product produced by the process of claim 23.

26. A process for preparing an aqueous coating material comprising

I) mixing at least one of the following in an aqueous medium:
  A) at least one polyester that is water-soluble or water-dispersible,
  B) at least one polyurethane acrylate that is water-soluble or water-dispersible,
  C) at least one amino resin that is itself water-soluble or water-dispersible or is water-soluble or water-dispersible in the presence of the polyester and the polyurethane acrylate, and
  D) at least one of a color pigment, an effect pigment, a color and effect pigment, and a filler,
to give component (I); and II) mixing component (I) with at least one polyisocyanate, wherein the polyester comprises a reaction product of a1) a mixture comprising
  a11) from 40 to 80 mol % of the mixture of at least one of an aliphatic polycarboxylic acid, a cycloaliphatic polycarboxylic acid, an esterifiable derivative of an aliphatic polycarboxylic acid, and an esterifiable derivative of a cycloaliphatic polycarboxylic acid,
  a12) from 20 to 60 mol % of the mixture of at least one of an aromatic polycarboxylic acid and an esterifiable derivative of an aromatic polycarboxylic acid; and a2) at least 60 mol % of the polyester of at least one of an aliphatic polyol and a cycloaliphatic polyol, wherein each of the aliphatic polyol and the cycloaliphatic polyol include in its molecule at least one structural element —$C(R^1R^2)$—$CH_2OH$, wherein $R^1$ and $R^2$ are each at least one of a methylol group, a 1 to 20 carbon aliphatic hydrocarbon radical, a cyclo-aliphatic hydrocarbon radical, and an aromatic hydrocarbon radical.

27. The process of claim 26, wherein a1) and a2) are reacted with one another in a molar ratio a1):a2) of 1.1:1 to 2:1.

28. The process of claim 26, wherein the degree of branching of the polyester is from 1.0 to 2.0 mol/kg.

29. The process of claim 26, wherein the polyester has at least one of a number-average molecular weight of from 650 to 2500 daltons, an acid number of from 25 to 55 mg KOH/g, and a hydroxyl number of from 80 to 180 mg KOH/g.

30. The process of claim 26, wherein the coating material comprises a mixture product of
  A) from 2 to 90% by weight of the polyester,
  B) from 1 to 80% by weight of the polyurethane acrylate,
  C) from 1 to 80% by weight of the amino resin, and
  D) from 1 to 95% by weight of at least one of the color pigment, the effect pigment, the color and effect pigment, and the filler,
the percentages by weight being based on an overall solids content of the coating material.

31. The process of claim 26, wherein the polyisocyanate is added in an amount of from 0.5 to 50% by weight based on an overall solids content of the coating material.

32. The process of claim 26, wherein (A), (B), and (C) are added in a ratio (A):(B):(C) of 25–70:10–40:10–40.

33. The process of claim 26, wherein the polyurethane acrylate comprises a reaction product of a free-radical polymerization in an aqueous dispersion
  B1) of at least one dispersed polyurethane resin comprising a reaction product of
    b1) at least one polyisocyanate and optionally at least one monoisocyanate;
    b2) at least one of a polyesterpolyol and a polyetherpolyol each having a number-average molecular weight of from 400 to 5000;
    b3) at least one compound comprising at least one of
      b31) at least one isocyanate-reactive group and
      b32) at least one of an anionic group and a group convertible into anions by neutralizing agents, and
      b33) at least one nonionic hydrophilic group; and
    b4) at least one compound comprising
      b41) at least one isocyanate-reactive group and
      b42) at least one olefinically unsaturated group; and
  B2) at least one olefinically unsaturated monomer.

34. The process of claim 26, wherein the amino resin comprises a melamine-formaldehyde resin containing $C_1$ to $C_4$ alkyl ether groups and containing from 0.1 to 1.5 free imino groups per melamine nucleus.

35. The process of claim 26, wherein the mixing further comprises at least one ingredient curable with actinic radiation.

36. The process of claim 26 further comprising applying the coating material to a substrate to form an at least one coat paint system.

37. The paint system produced by the process of claim 36.

38. A product produced by the process of claim 36.

* * * * *